Aug. 4, 1959

R. T. WHITCOMB 2,898,059

FUSELAGE SHAPING TO REDUCE THE STRENGTH
OF THE INITIAL SHOCK WAVE ON
LIFTING AIRPLANE WINGS

Filed Sept. 11, 1957

INVENTOR
RICHARD T. WHITCOMB

BY
ATTORNEYS

Aug. 4, 1959   R. T. WHITCOMB   2,898,059
FUSELAGE SHAPING TO REDUCE THE STRENGTH
OF THE INITIAL SHOCK WAVE ON
LIFTING AIRPLANE WINGS
Filed Sept. 11, 1957   2 Sheets-Sheet 2

INVENTOR
RICHARD T. WHITCOMB

BY
ATTORNEYS

United States Patent Office

2,898,059
Patented Aug. 4, 1959

2,898,059

FUSELAGE SHAPING TO REDUCE THE STRENGTH OF THE INITIAL SHOCK WAVE ON LIFTING AIRPLANE WINGS

Richard T. Whitcomb, Hampton, Va.

Application September 11, 1957, Serial No. 683,431

4 Claims. (Cl. 244—130)

(Granted under Title 35, U.S. Code (1952), sec. 266)

The invention described herein may be manufactured and used by or for the Government of the United States of America for governmental purposes without the payment of any royalties thereon or therefor.

The present invention relates to an airplane in which the fuselage is shaped to reduce the strength of the initial shock wave on the lifting wings of the airplane.

When the speed of an airplane with a lifting wing approaches the speed of sound, an initial shock wave usually develops above the upper surface of the wing. This shock wave usually causes separation of the boundary layer on this surface which results in a substantial increase in drag, buffeting, stability problems, and other adverse aerodynamic effects. It is the purpose of the present invention to reduce the strength of this initial shock wave and thus reduce the associated boundary-layer separation and its adverse effects through an improved, special shaping of the fuselage.

As disclosed in U.S. patent application Ser. No. 606,176 entitled, "Fuselage Shaping To Reduce the Strength of Shock Waves About Airplanes at Transonic and Supersonic Speeds," by the present inventor, the shock strength at transonic and supersonic speeds is reduced by shaping the fuselage to provide improvements of the longitudinal or streamwise development of cross-sectional areas of the complete airplane. It has been found by experimentation that such fuselage shapings also reduce the strength of the initial shock wave on the upper surface of a lifting wing at high subsonic speeds. The invention described herein is essentially an improvement of the previous invention for accomplishing this action. As described in the preceding patent application, the flow fields causing the shock waves above and below the wing are largely separated by the presence of the wing. As a result, any fuselage shaping below the wing should have little effect on the initial shock wave above the upper surface of the wing. Therefore, the improvement of body shaping of the present invention is limited to the region above the wing. As with the previous invention, the fuselage shapings provided by the present invention improve the longitudinal developments of cross-sectional area above the wing. However, with the present invention, the shapings above the wing are simplified without a loss of effectiveness by concentrating them on the top of the fuselage and by limiting them to the forward portion of the fuselage. Concentration of the shaping on the top, or top and forward portions, of the fuselage also results in secondary improvements of the aerodynamic characteristics.

The invention is described by means of the following figures.

Figure 1:
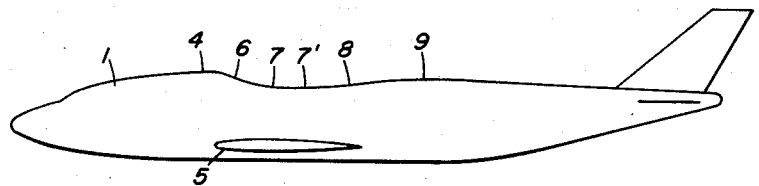
Fig. 1 is a side view of a typical sweptback wing airplane with the representative embodiment of the present invention.
Figure 2:
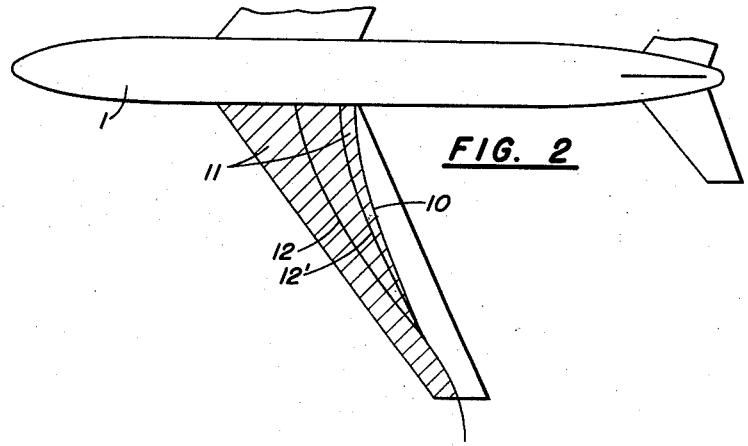
Fig. 2 is a plan view of the airplane of Figure 1.
Figure 3:
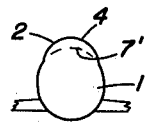
Fig. 3 is a partial front view of the airplane of Figures 1 and 2.

For the representative embodiment of the invention shown in Figures 1, 2 and 3 the fuselage shaping is concentrated in the region 2 on top of the fuselage. Of course, the shaping need not have this exact cross-sectional shape. For the most general embodiment with the swept-wing configuration shown in Figure 2, the top side of the fuselage 1 is contoured longitudinally with a convex curvature 4 in the vicinity of the leading edge of the wing-fuselage juncture 5, a downward slope 6 in the region of the forward portion of the juncture, concave curvature 7 in the vicinity of the middle region of the juncture, a longitudinally extending region 7' of substantially constant cross sectional area in a longitudinally extending region in the vicinity of the aft half of the juncture, an upward slope 8 near the trailing edge of the juncture, and a convex curvature 9 aft of the juncture. Usually the curvature of the convex bend 4 is relatively abrupt, while those of the concave bend 7 and the convex bend 9 are relatively gradual. The diminution in fuselage cross sectional area from the leading edge to the region of substantially constant cross-sectional area usually is approximately equal to the maximum cross-sectional area for the wing above the wing chord plane, these cross-sectional areas being in planes substantially perpendicular to the fuselage longitudinal axis. With wings which have unswept or sweptforward rather than sweptback trailing edges as shown, the most satisfactory effect is obtained with the convex curvature 9 located in the vicinity of the trailing edge of the wing-fuselage juncture rather than aft of it as shown in Figures 1 and 2. For simplicity, the fuselage of Figure 1 is shown without special shaping on the bottom. In some embodiments of the present invention, the fuselage below the wing might incorporate considerable shaping. However, the favorable effect of such shaping would be small compared to that of the primary shaping concentrated on top of the fuselage, as shown in Figure 1.

Figure 4:
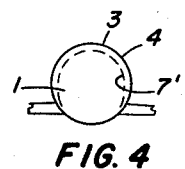
Fig. 4 is a partial front view of an airplane with fuselage shaping not incorporating the present invention.

By concentrating the shaping on top of the fuselage in region 2 rather than distributing it around the fuselage above the wing in region 3 of Figure 4, the amount of fuselage structure affected by the shaping is considerably reduced with a resulting simplification of construction. When the shaping is obtained by adding structure to an existing airplane design, as shown in Figure 3, this simplification of construction is particularly great. The amount of additional airplane skin and supporting structure is greatly reduced and the number of windows and doors through the addition is generally lessened. Concentration of an addition to an existing airplane design on top of the fuselage also provides a much more usable additional volume. Additional fuel tanks or equipment can much more readily be enclosed in the concentrated addition of Figure 3 than in the distributed addition of Figure 4.

Figure 5:
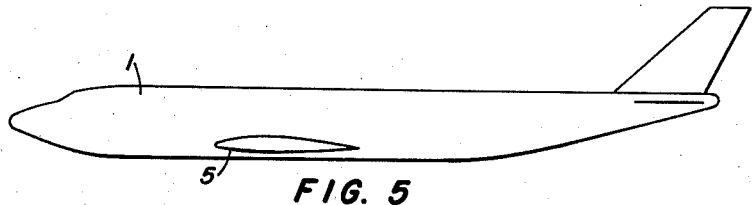
Fig. 5 is a side view of an airplane similar to that of Figures 1 and 2 with a normal fuselage.
Figure 6:
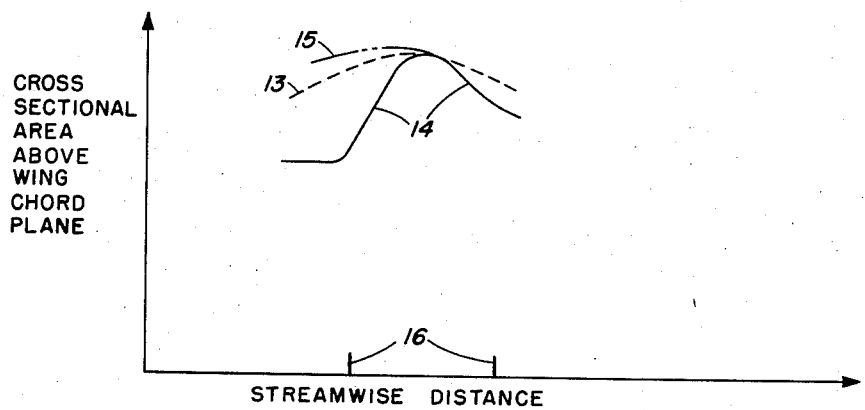
Fig. 6 is a diagram showing the variation of cross-sectional area above the wing chord plane versus airplane length for the airplane configurations of Figures 1, 2 and 3.

The effective longitudinal development of cross-sectional area, above the wing chord plane, for the airplane embodying the present invention shown in Figures 1 and 2 is shown by the line 13 in the diagram of Figure 6. For comparison, the area development for the similar airplane without special fuselage shaping shown in Figure 5 is shown by the line 14 in Figure 6. The longitudinal position of the wing-fuselage juncture 5 is indicated by 16 in this figure. The abruptness of the peak of the area development for the airplane with the special fuselage shaping is considerably less severe than that associated with the airplane with the normal fuselage. Experimental results have indicated that significant reduction of the strength of the initial shock above the upper surface of the wing is associated with such a change.

The aerodynamic action whereby the fuselage shaping above described reduces the strength of the initial shock wave above the upper surface of the wing will now be described using the diagram of the air flow over the wing of representative airplane shown in Figure 2. With a normal amount of lift at Mach numbers just above that at which the initial shock wave causes an increase in drag (i.e. Mach No.=0.8 to 0.9), the initial shock will be at about the line 10 on the wing. This shock wave is associated with the deceleration of local supersonic flow in the shaded region 11 above the upper surface of the wing. The flow over wings with other planiforms is usually similar in nature. The reversal of the curvature 7 of the top of the shaped fuselage shown in Figure 1 produces disturbances which spread broadly, decelerating the supersonic flow in the region between lines 12 and 12' of Figure 2. The resulting deceleration of the flow ahead of the shock 10 reduces the strength of the shock.

Because of the broad spreading of disturbances produced by fuselage shaping, the effect of shaping on top of the fuselage on the flow over the wing is essentially the same as that of an equal amount of shaping on the sides even though such shaping is farther from the wing. As a result, a shaping concentrated on the top of the fuselage is as effective as a shaping distributed around the fuselage in reducing the strength of the initial shock wave above the wing.

A secondary favorable effect of concentrating the fuselage shaping on top of the fuselage is associated with the flow over the forward portion of the special shaping. Usually the magnitude of the convex curvature of the forward portion of the shaping above the wing will be considerably greater than that below the wing as shown in Figure 1. As a result, a strong vertical pressure gradient will usually exist near the side of the fuselage in the vicinity of the leading edge of the juncture. This gradient causes a pronounced upflow in this region which leads to severe adverse local induced velocities and vortices near the leading edge of the upper surface of the wing in the vicinity of the fuselage. The upflow in the locality of the wing and the resulting adverse effect are reduced by concentrating the fuselage shaping on top of the fuselage rather than on the sides or around the fuselage above the wing.

Figure 7:
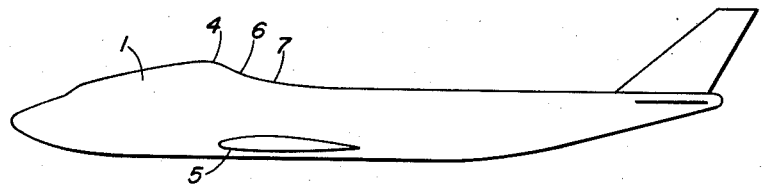
Fig. 7 is an alternate embodiment of the present invention.

The construction of the fuselage shaping is further simplified with some improvement of effectiveness of the shaping by concentrating the shaping on the forward part of the fuselage as shown in Figure 7. The embodiment of the invention shown in Figure 7 comprises a convex curvature 4 of the top of the fuselage in the longitudinal vicinity of the leading edge of the wing-fuselage juncture 5, a downward slope 6 in the region of the forward portion of juncture, and a concave curvature in the vicinity of the middle region of the juncture. The magnitude of this alternate simplified shaping which provides the greatest reduction of the strength of the initial shock wave is usually somewhat greater than that of the more extensive shaping shown in Figure 1. With this embodiment the proportion of the structure affected by shaping is reduced with a resulting simplification of the structure.

The effective longitudinal development of cross-sectional area for the representative airplane with the alternate fuselage shaping shown in Figure 7 is shown by line 15 in Figure 6. This alternate shaping provides a reduction in the abruptness of the peak of similar magnitude to that provided by the more extensive shaping of Figure 1 as shown by line 13 of Figure 6. Also, the disturbances produced by this shaping provide approximately the same deceleration of the supersonic flow ahead of the initial shock wave above the wing. Therefore, the effectiveness of such shapings in reducing the strength of the initial shock wave is essentially the same as that of the more extensive shaping of Figure 1. Further, the alternate shaping shown in Figure 7 provides a favorable increase in airplane lift for a given condition compared with that obtained with the shaping shown in Figure 2.

For the speed and lift conditions at which the fuselage shaping will usually be most useful, the flow will be supersonic by a considerable amount over a large portion of the upper surface of the wing. Therefore, the areas of the wing used to determine the most satisfactory shape for the fuselage above the wing for such conditions should be obtained using oblique cutting planes similar to those used for airplanes intended for supersonic forward speeds as described in the above mentioned application. The design Mach number should be a mean of the local Mach numbers somewhat above the wing surface and ahead of the shock wave.

What is claimed is:

1. In an airplane, a fuselage, a wing extending from said fuselage, said fuselage having the top thereof indented from normal streamline configuration in the longitudinal vicinity of said wing, the volume of said indentation being approximately equal to the volume of said wing above the chord plane of the wing.

2. In an airplane, a fuselage, a wing extending from said fuselage, said fuselage being indented in the vicinity of said wing, the total area of the indentation from normal streamline configuration at any longitudinal station in a plane substantially perpendicular to the fuselage longitudinal axis at said station being approximately equal to the area of said wing in said plane above the chord plane of said wing, said indentation being on the top side of said fuselage.

3. In an airplane, a fuselage, a wing extending from said fuselage, said fuselage having a convex curvature on the top thereof in the longitudinal vicinity of the leading edge of the wing-fuselage juncture, a downward slope in the region of the forward portion of said juncture, said downward slope diminishing the fuselage cross-sectional area, and a concave curvature in the vicinity of the middle region of said juncture, said fuselage having substantially constant cross-sectional area in a longitudinally extending region in the vicinity of the aft half of the juncture, the diminution of the cross-sectional area of the fuselage from said leading edge to the region of substantially constant cross-sectional area in any plane substantially perpendicular to the airplane longitudinal axis being approximately equal to the maximum cross-sectional area of said wing in said plane above the wing chord plane.

4. In an airplane, a fuselage, a wing extending from said fuselage, said fuselage having a convexity thereon in the longitudinal vicinity of the leading edge of the wing-fuselage juncture, said fuselage having a concavity therein in the longitudinal vicinity of the middle region of said juncture resulting in diminution of fuselage volume, and a transitional slope connecting said convexity with said concavity, said convexity, slope and concavity being on the top side of said fuselage, the diminution of fuselage volume rearwardly of said leading edge of the wing-fuselage juncture being approximately equal to the volume of said wing above the chord plane of the wing.

References Cited in the file of this patent

FOREIGN PATENTS 301,390     Germany _____ June 28, 1920